United States Patent
Ali et al.

(10) Patent No.: US 10,070,071 B2
(45) Date of Patent: Sep. 4, 2018

(54) METHOD OF IMAGING A MACHINE ENVIRONMENT AND MACHINE SYSTEM IMPLEMENTING SAME

(71) Applicant: Caterpillar Inc., Peoria, IL (US)

(72) Inventors: Hassan Ali, Peoria, IL (US); Doug Husted, Secor, IL (US)

(73) Assignee: Caterpillar Inc., Deerfield, IL (US)

( * ) Notice: Subject to any disclaimer, the term of this patent is extended or adjusted under 35 U.S.C. 154(b) by 198 days.

(21) Appl. No.: 15/252,071

(22) Filed: Aug. 30, 2016

(65) Prior Publication Data

US 2018/0063446 A1    Mar. 1, 2018

(51) Int. Cl.
*H04N 5/265* (2006.01)
*H04N 5/247* (2006.01)
*H04N 5/232* (2006.01)

(52) U.S. Cl.
CPC ........ *H04N 5/265* (2013.01); *H04N 5/23238* (2013.01); *H04N 5/247* (2013.01)

(58) Field of Classification Search
CPC ..... H04N 5/265; H04N 5/247; H04N 5/23238
See application file for complete search history.

(56) References Cited

U.S. PATENT DOCUMENTS

| | | |
|---|---|---|
| 8,890,977 B2 | 11/2014 | Lablans |
| 9,197,885 B2 | 11/2015 | Sun |
| 9,262,801 B2 | 2/2016 | MacMillan |
| 9,268,202 B1 | 2/2016 | Dey |
| 2014/0105481 A1 | 4/2014 | Hasselbusch |
| 2016/0217331 A1* | 7/2016 | Kowatari ............... E02F 9/261 |

* cited by examiner

*Primary Examiner* — Nam Pham
(74) *Attorney, Agent, or Firm* — Mattingly Burke Cohen & Biederman

(57) ABSTRACT

Imaging a machine environment includes receiving image data from imaging devices on a machine, and comparing a calibration feature in an image defined by the image data with a virtual reference feature in a stored calibration model. A plurality of images are stitched together based on an error between the calibration feature and the virtual reference feature, to produce a composite image of the machine environment. Related setup control logic and strategy, and hardware configurations are disclosed.

20 Claims, 5 Drawing Sheets

METHOD OF IMAGING A MACHINE ENVIRONMENT AND MACHINE SYSTEM IMPLEMENTING SAME

TECHNICAL FIELD

The present disclosure relates generally to imaging a machine environment, and more particularly to stitching images in a machine display system according to a position or orientation of a virtual reference feature.

BACKGROUND

Systems and strategies for expanding and enhancing an operator's awareness of a machine environment have become commonplace in recent years. Prescribed location and configuration of operator cab structures, mirrors and, increasingly, electronic sensors and imaging devices are all used to improve operator and machine efficiency as well as operator awareness of obstructions and hazards.

A conventional imaging and display system typically positions an imaging device such as a digital camera at a fixed location on a machine, and produces a digital feed of the field of view of the camera. Such cameras may have a fixed field of view, or in some instances a field of view that can be adjusted by rotating the camera upon a mount. The operator can view the images produced by the camera on a display positioned within the operator cab in a well-known manner.

A shortcoming in conventional strategies is that the camera commonly has a limited field of view that includes only a portion of what the operator would ideally be provided. Cameras positioned upon movable mounts and the like can partially address such limitations, but tend to be more expensive and less reliable. In recent years, proposals have been made to utilize multiple cameras to provide an operator multiple or composite images that encompass most or all of the surrounding machine environment.

A challenge arising in the context of synthesizing multiple different camera views is presentation of the image(s) to the operator in a way that accurately reflects the machine environment, but is also readily interpretable. Strategies for "taping" or "stitching" images are known which generally attempt to merge multiple different camera images into a realistic whole for displaying to the operator. U.S. Pat. No. 9,262,801 to MacMillan et al. is directed to one such strategy, and proposes multiple cameras arranged in an array that allows the cameras to have adjacent fields of view while each being pointed inward. The read window of an image sensor of each camera can allegedly be adjusted to minimize the overlap between adjacent fields of view, maximize correlation within the overlapping portions of the fields of view, and correct for manufacturing and assembly tolerances.

SUMMARY OF THE INVENTION

In one aspect, a method of imaging a machine environment includes receiving image data from a plurality of imaging devices mounted to a machine, the plurality of imaging devices having among them a plurality of different fields of view that each include a different part of the machine. The method further includes comparing a calibration feature in one of a plurality of images defined by the image data with a virtual reference feature in a stored calibration model. The method further includes stitching a plurality of images based on an error in at least one of a position or an orientation of the calibration feature relative to the virtual reference feature, and displaying a composite image of the machine environment produced from the stitched images.

In another aspect, a method of setting up a display system in a machine includes receiving initial image data from a plurality of imaging devices of the display system having a plurality of different fields of view each including a different part of the machine. The initial image data defines a plurality of images including a plurality of setup features that are each imaged from an article external to the machine. The method further includes storing image stitching settings that are based upon at least one of relative locations or relative orientations among the plurality of setup features. The method further includes receiving subsequent image data from the plurality of imaging devices of the display system, the subsequent image data defining a plurality of images including a plurality of virtual reference features each imaged from an article resident on the machine, and stitching the plurality of images defined by the subsequent image data according to the stored image stitching settings. The method still further includes storing a calibration model that includes the plurality of virtual reference features arranged according to the stitching of the plurality of images.

In still another aspect, a machine system includes a machine having a machine body, and a plurality of ground-engaging propulsion elements supporting the machine body. The machine system further includes a display system having a display, a plurality of imaging devices mounted to the machine body and having a plurality of different fields of view, and a control mechanism. The plurality of imaging devices are structured to produce image data defining a plurality of images of the corresponding field of view, and at least one of the plurality of images including a calibration feature that is imaged from an article resident on the machine. The control mechanism is structured to receive the image data from the plurality of imaging devices, compare the calibration feature with a virtual reference feature in a stored calibration model, and stitch the plurality of images for displaying on the display according to an error in at least one of a location or an orientation of the calibration feature relative to the virtual reference feature.

DETAILED DESCRIPTION

Figure 1:
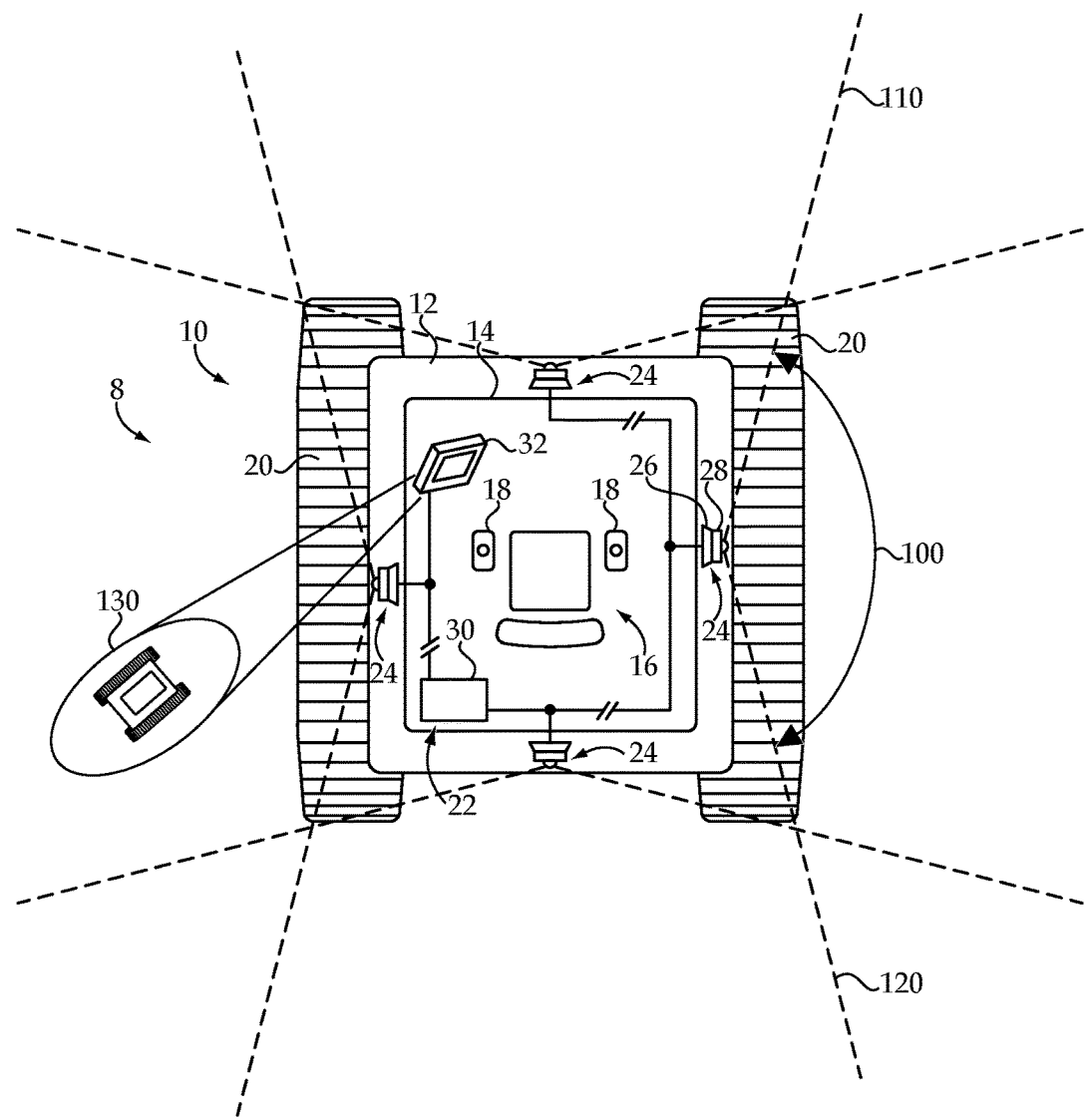
FIG. 1 is a diagrammatic view of a machine system, according to one embodiment, and including a detailed enlargement.

Referring to FIG. 1, there is shown a machine system 8 according to one embodiment, and including a machine 10 having a machine body 12, and a plurality of ground-engaging propulsion elements 20 supporting the machine body 12. The machine system 8 further includes a display system 22 including a display 32, a plurality of imaging devices 24 mounted to the machine body 12 and having a plurality of different fields of view, and a control mechanism 30 that includes one or more data processors and suitable computer memory. The machine system 8 is shown in the context of a tracked machine, where the ground-engaging propulsion elements 20 include a first track and second track positioned at opposite lateral sides of the machine body 12, and with an operator cab 14 mounted upon or made integrally with the machine body 12. It should be appreciated that the machine 10 might be any of a variety of different types of machines. Tracked machines such as excavators, track-type tractors, cranes, handlers, loaders, and many others could all benefit from application of the teachings set forth herein. Rather than a tracked or "track-type" machine, the machine system 8 could include a wheeled machine such a wheel tractor, a wheel loader, a truck, a skidder, a scraper, a grader, or any of a variety of other types of wheeled machines.

The display system 22 is shown resident on the machine 10, however, it should be appreciated that certain of the components of the display system 22 such as the display 32 itself might be positioned remotely such as at a management trailer or other suitable control center. The machine 10 might be controlled by an operator at an operator control station 16 positioned in the operator cab 14 in certain embodiments; however, in alternative implementations such as certain autonomous machines, the operator control station 16 might be positioned remotely. The display 32 will typically be positioned in the operator cab 14 and oriented for easy viewing by an operator seated at the operator control station 16. Operator controls 18 might be provided at or within easy reach of the operator control station 16 in a practical implementation strategy.

A detailed enlargement 130 is also shown in FIG. 1 and illustrates what might be displayed on the display 32 for viewing by an operator. As noted above, each of the imaging devices 24 can include a different field of view, with each of the fields of view including a different part of the machine 10. One field of view is shown extending between a first boundary 110 and a second boundary 120, to define a view angle 100, and includes part of the machine body 12 and part of one of the ground-engaging elements 20. The view angle 100 might have a range of sizes, but will commonly be greater than 100 degrees and less than 180 degrees. In the illustrated embodiment, a total of four imaging devices 24 are shown positioned such that a forward field of view overlaps a left field of view and a right field of view, and a rear field of view also overlaps with the left field of view and the right field of view. In a practical implementation strategy, an aggregated field of view of the plurality of the imaging devices 24 may be equal to about 360 degrees, or greater. As shown in the example detailed enlargement, the display 32 can be understood to produce a composite image that approximates a bird's eye view of the machine 10, and encompasses a full 360 degrees of the surrounding machine environment. In a practical implementation strategy, an operator may be able to adjust images displayed by way of the display system 22 to various ends, and thus the example bird's eye view image shown in the detailed enlargement 130 is but one example among a number of different perspectives and viewing angles that might be generated. Those skilled in the art will appreciate that the image produced on the display 32 may be a composite image of the machine environment produced by stitching together individual images corresponding to the plurality of different fields of view of the imaging devices 24. As will be further apparent from the following description, the present disclosure contemplates unique strategies for imaging the machine environment to produce composite images that are relatively seamless and avoid shortcomings of other known technologies where various errors in stitching together a plurality of different images could sometimes occur.

Each of the plurality of imaging devices 24 can include a mount 26 attached to the machine body 12, such as attached to the operator cab 14 or positioned elsewhere on the machine body 12. Attached to each of the mounting structures or mounts 26 is a camera 28, such as a conventional digital camera, in communication with the control mechanism 30. The imaging devices 24 may be structured to produce image data defining a plurality of images, of the corresponding fields of view. In a practical implementation strategy, the control mechanism 30 may receive the image data from the plurality of imaging devices 24 and produce by way of controlling the display 32 a composite image of the machine environment produced by stitching the plurality of images. The composite image may include a substantially 360-degree, real-time view on the display 32.

As noted above, the control mechanism 30 may be structured to receive the image data from the plurality of the imaging devices 24, and also to compare a calibration feature included within at least one of the plurality of images with a virtual reference feature in a stored calibration model. The control mechanism 30 may further be structured to stitch the plurality of images for displaying on the display 32 according to an error in at least one of the location or an orientation of the calibration feature relative to the virtual reference feature. The functionality of the control mechanism 30, as well as examples of the calibration feature and the virtual reference feature, will be further understood by way of the following description.

Figure 2:
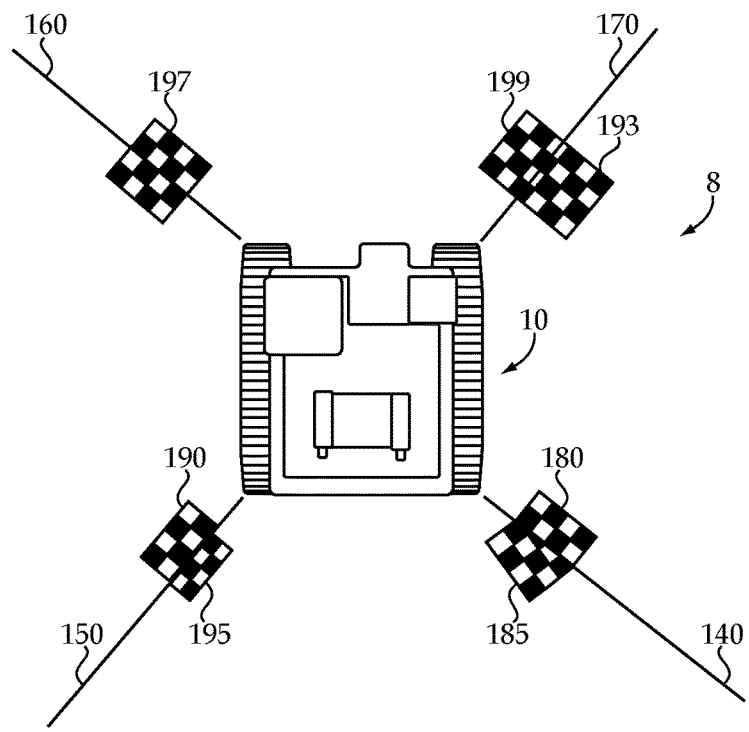
FIG. 2 is a diagrammatic view of the machine system at one stage of setting up for service.

Referring now also to FIG. 2, there is shown the machine system 8 as it might appear in an image produced by display system 22 prior to calibrating, and at one stage of setting up the display system 22 for operation. Those skilled in the art will appreciate that the machine system 8, and more particularly the display system 22, will typically need to be calibrated with respect to image stitching before being placed in the field. The initial calibration can include establishing stitching settings once the imaging devices 24 are mounted at fixed positions and orientations to the machine body 12. In FIG. 2, a plurality of image seams 140, 150, 160, and 170 are shown projecting outwardly from corners of the machine 10. During a setup procedure articles in the nature of checkerboard mats or tarps may be placed external to the machine and around the machine 10 upon the underlying substrate and images produced by each of the imaging devices 24. Since adjacent fields of view of the plurality of imaging devices 24 will also typically be at least partially overlapping, the checkerboard tarps can be placed at locations where they can be simultaneously imaged with two imaging devices that are adjacent to one another. Based upon the similarity and/or the differences between the images in the adjacent fields of view, namely the relative locations or orientations, the manner in which the plurality of images are stitched together to produce a composite image can be adjusted.

In FIG. 2, an imaged setup feature 197 is shown positioned approximately as it might appear when imaged setup features from the adjacent fields of view are properly stitched together. In other words, in the illustrated example in FIG. 2 the setup feature 197 is an approximately accurate representation of the checkerboard tarp that is placed at the seam 160. At the seam 170 a setup feature 199 on a first side can be seen to be slightly different from a setup feature 193 on the opposite side, and represents a partial duplication of features in the adjacent fields of view. Another way to understand the appearance of the setup features 199 and 193 is that the stitching settings are not proper since the display system 22 is not yet calibrated, and some adjustment will be necessary so that the setup features 199 and 193 will together have an appearance closer to or identical to that of the setup feature 197. At the seam 140, the setup features 180 and 185 are misaligned in yet another manner that will be necessary to correct to properly stitch together the images from the corresponding adjacent fields of view. At the seam 150 yet another example of misaligned setup features 190 and 195 is shown.

Figure 3:
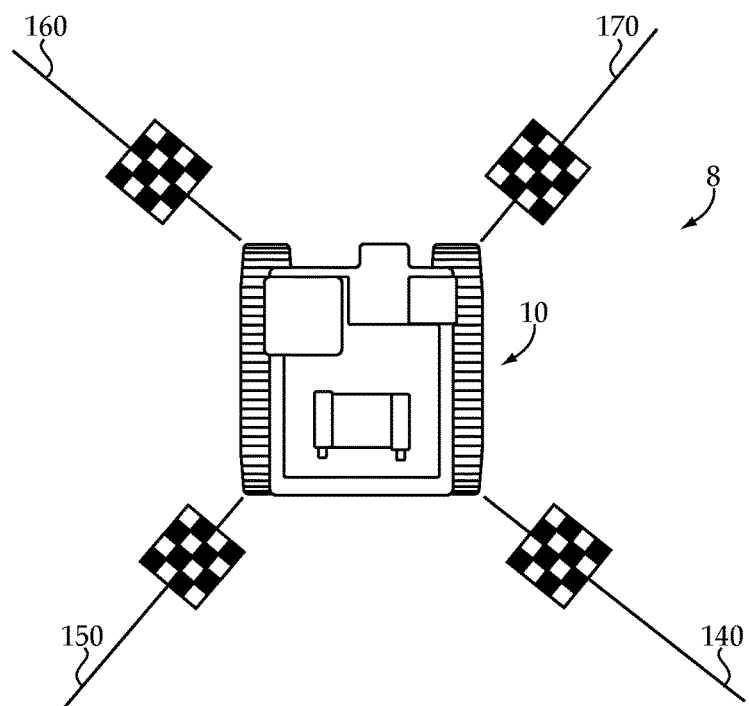
FIG. 3 is a diagrammatic view of the machine system at another stage of setting up for service.

Referring also now to FIG. 3, there is shown an image of the machine system 8 as it might appear where the plurality of images produced by the plurality of imaging devices 24 are properly stitched together, with the display system 22 calibrated. Those skilled in the art will be generally familiar with the manner in which images can be stitched together properly, or improperly to varying degrees leading in some cases to duplication of image elements and in other cases to blind spots, or other problems. Those skilled in the art will also be familiar with the manner in which image data can be manipulated to locate individual pixels in one image relative to individual pixels in another image to impart the effects that would be produced from actual physical rotation, shifting horizontally, or shifting vertically, of the imaging devices, without actually physically changing the locations or orientations of those imaging devices.

Once set up in the general manner depicted in FIG. 2 and FIG. 3, the machine system 8 could be placed in the field for service. The present disclosure also contemplates additional setup procedures that can compensate for errors in stitching of images that can arise in the field because of shifting of the physical locations or orientations of imaging devices mounted to a machine. Many machines operate in relatively rugged environments, and can be subjected to extremes of temperature as well as bumps, vibrations, and shocks. For these reasons, despite best efforts in setting up a display system for operation at a factory, field service can often lead to degradation in image stitching in a display system. As a result, blind spots can be created, and image duplication can occur, or other problems that are considered undesirable can arise. While machines could theoretically be equipped with tarps or other articles that could be placed on the substrate and adjacent to the machine to replicate the setup calibration procedure of FIG. 2 and FIG. 3 in the field, such an approach would generally be considered undesirable and unnecessarily complicated and time consuming.

Figure 4:
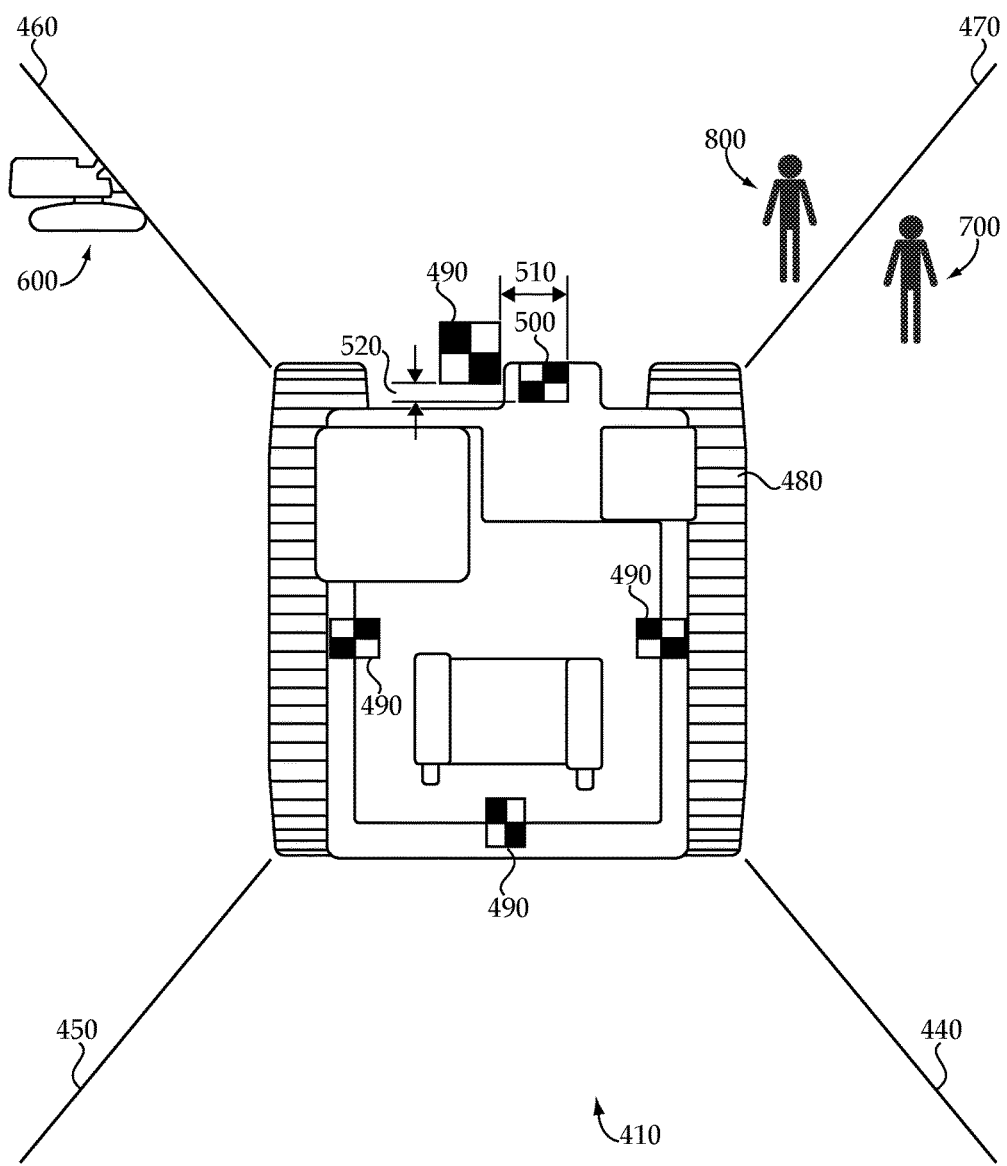
FIG. 4 is a diagrammatic view showing an image that might be displayed to an operator during setting up for service.

Referring now to FIG. 4, there is shown a composite image 410, similar to what might actually be viewed by an operator in the machine system 8 when the display system 22 has become mis-calibrated for any of the reasons discussed above, or for still another reason. In FIG. 4, the seams 440, 450, 460 and 470 are shown, which seams might not be actually visible in an image displayed to an operator. At the seam 460, part of a machine 600 is visible in one of the fields of view, but none of the machine 600 is visible in the adjacent field of view because of a degradation in stitching accuracy. At seam 470, a figure 700 is shown in one of the fields of view and a figure 800 is shown in the other of the fields of view. The figure 800 is actually a duplication of the figure 700, imaged by two imaging devices and improperly stitched. Accordingly, the composite image 410 depicted in FIG. 4 actually includes a blind spot that obscures part of the machine 600, and includes duplication of images of a person to make it appear there are actually two people in proximity to the machine when in reality there is only one. An icon or an image 480 of the machine is shown in the center of the composite image 410. Also shown overlaying the machine image 480 are a plurality of imaged calibration features 490 in the nature of markings on the machine body 12. In a practical implementation strategy, the calibration features 490 could have the form of painted markings, taped-on stripes, or decals, the significance of which will be further apparent from the following description.

Figure 5:
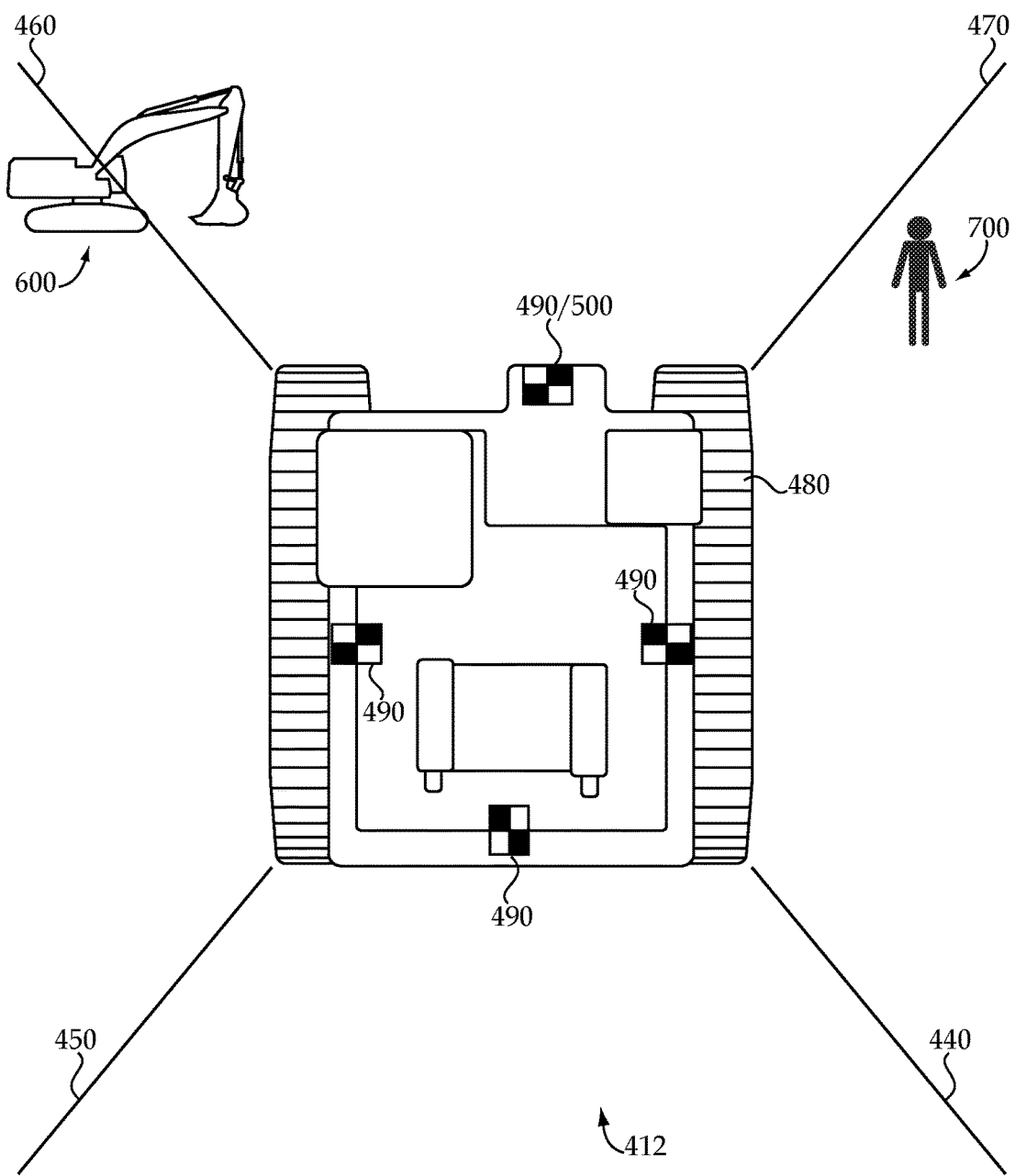
FIG. 5 is another diagrammatic view of an image displayed during setting up for service.

It will be recalled that during setting up the display system 22 and the machine system 8 for operation the present disclosure contemplates creating a stored calibration model. The calibration model may include a stored image of at least a portion of the field of view of a first one of the imaging devices 24 in a calibrated state, and in a practical implementation strategy includes a stored composite image including at least a portion of the field of view of each of the imaging devices 24 in calibrated states. When mis-calibrated, as in FIG. 4, one or more of the calibration features 490 may be displayed at a location that is different from or an orientation that is different from the orientation of a virtual reference feature 500 in the stored calibration model. In FIG. 4, a displacement 510 in a first direction and a displacement 520 in a second direction of the calibration feature 490 relative to the virtual reference feature 500 is shown. It will thus be understood that the calibration features 490 represent actual imaged features of the machine 10, which may or may not be in the right location when the images from the imaging devices 24 are stitched according to the stored stitching settings. The virtual reference feature 500 is a stored image feature that can be superimposed on the real time image to detect and correct mis-calibration, as further discussed herein. Referring also now to FIG. 5, there is shown a composite image 410 as it might appear when the image from one or more of the imaging devices 24 is shifted according to the displacements 510 and 520 to restore the correct stitching settings, or otherwise compensate for misalignments among the images. It can be seen that the calibration feature 490 is shown located now in register with the virtual reference feature 500. The entirety of the machine 600 is now shown, and the figure 800 is no longer visible.

INDUSTRIAL APPLICABILITY

Figure 6:
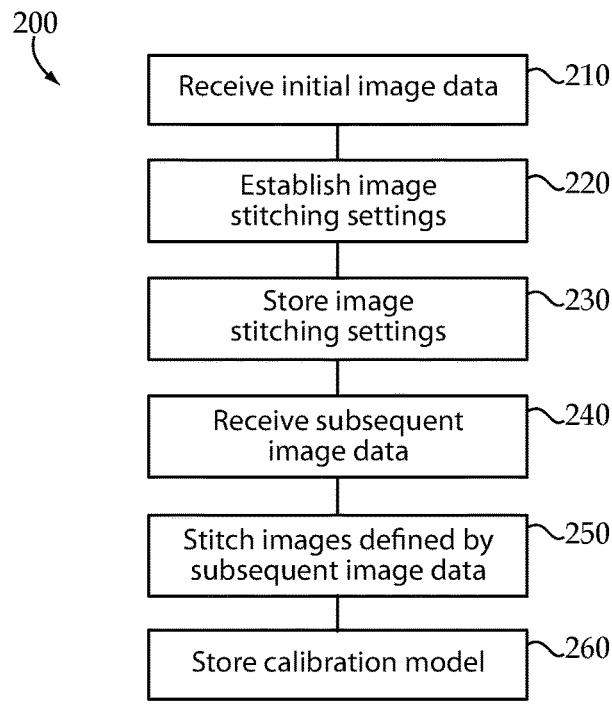
FIG. 6 is a flowchart illustrating aspects of a setup process, according to one embodiment.

Referring to FIG. 6, there is shown a flowchart 200 illustrating example steps in a setup process according to the present disclosure. According to flowchart 200, in a block 210 initial image data is received. The receiving of initial image data from the plurality of imaging devices 24 of the display system 22 can include receiving initial image data defining a plurality of images that include a plurality of setup features that are each imaged from an article external to the machine. It will be recalled from the foregoing discussion of FIG. 2 and FIG. 3 that the checkerboard tarps can serve as setup features once imaged that are used in establishing the initial stitching settings for the display system 22. As also noted above, the initial image data may define a plurality of images including a plurality of setup features each imaged from an article external to the machine that is placed upon an underlying substrate and located adjacent to the machine 10. As also described above, the image stitching settings may be established at least in part by aligning the plurality of setup features, such as those shown in FIG. 2, at seams between images defined by image data from the plurality of the imaging devices 24 having adjacent and overlapping fields of view.

From the block 210, the process of the flowchart 200 may advance to a block 220 to establish the image stitching settings, and thenceforth advance to a block 230 to store the image stitching settings. The image stitching settings may be based upon at least one of relative locations or relative orientations among the plurality of setup features. From the block 230, the process may advance to a block 240 to receive subsequent image data from the plurality of imaging devices 24 defining a plurality of images and including a plurality of virtual reference features each imaged from an article resident on the machine. It will be recalled from the foregoing discussion of FIG. 4 and FIG. 5 that the calibration features 490 can serve as virtual reference features in a stored calibration model. The articles resident on the machine that can be imaged to produce the virtual reference features can include decals or the like in certain embodiments. In other embodiments, a variety of other structures that can be recognized by a computer, such as surface patterns, edges, shapes, markings or some other feature can be used.

From the block 240, the process of the flowchart 200 can advance to a block 250 to stitch the images defined by the subsequent image data, according to the previously established stored image stitching settings. From the block 250, the process of flowchart 200 can advance to a block 260 to store the calibration model, for example in on-board computer readable memory, that includes the plurality of virtual reference features arranged according to the stitching of the plurality of images. As alluded to above, the stored calibration model may include a composite image formed from the plurality of images defined by the subsequent image data, and having a field of view aggregated from the plurality of fields of view of the imaging devices 24 that is substantially 360 degrees. The virtual reference features may be associated in the stored calibration model, such as by appropriate addressing in computer memory, one with each of the plurality of imaging devices 24.

Figure 7:
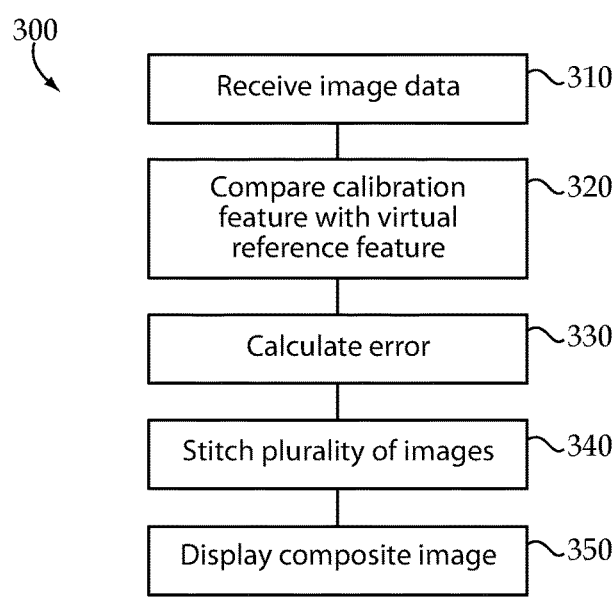
FIG. 7 is a flowchart illustrating aspects of a process for imaging a machine environment, according to one embodiment.

Referring now to FIG. 7, there is shown a flowchart 300 illustrating example methodology in relation to imaging a machine environment. At a block 310, image data is received, such as image data from the plurality of imaging devices 24. From the block 310, the process of the flowchart 300 can advance to a block 320 to compare a calibration feature, in at least one of the plurality of images, with a virtual reference feature in the stored calibration model. From the block 320, the process may advance to a block 330 to calculate an error in at least one of a position or an orientation of the calibration feature relative to the virtual reference feature. The calculated error could include one or more numerical quantities representing displacement(s) between the calibration feature and the virtual reference feature in one or more dimensions. The calculated error could also include an angular rotational displacement between the calibration feature and the virtual reference feature, a sizing multiplier indicative of a difference in size between the calibration feature and virtual reference feature, or some combination of these factors. From the block 330, the process may advance to a block 340 to stitch the plurality of images based on the error. Stitching of the plurality of images can be understood as transitioning from a raw imaged state, for example as depicted in FIG. 4, to a recalibrated or compensated image state such as that depicted in FIG. 5, so as to display a composite image of the machine environment produced from the stitched images at a block 350.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, feature and advantages will be apparent upon an examination of the attached drawings and appended claims.

What is claimed is:

1. A method of imaging a machine environment comprising:
   receiving image data from a plurality of imaging devices mounted to a machine, the plurality of imaging devices having among them a plurality of different fields of view that each include a different part of the machine;
   comparing a calibration feature in one of a plurality of images defined by the image data with a virtual reference feature in a stored calibration model;
   stitching the plurality of images based on an error in at least one of a position or an orientation of the calibration feature relative to the virtual reference feature; and
   displaying a composite image of the machine environment produced from the stitched images.

2. The method of claim 1 wherein the displaying a composite image of the machine environment produced from the stitched images further includes displaying a substantially 360-degree, real-time view on a display located in an operator cab of the machine.

3. The method of claim 1 wherein the stored calibration model includes a stored image of at least a portion of the field of view of a first one of the imaging devices in a calibrated state.

4. The method of claim 3 wherein the stitching of the plurality of images based on the error further includes stitching the plurality of images based on the error so as to compensate for mis-calibration of at least one of the plurality of imaging devices.

5. The method of claim 3 wherein the stored image includes a stored composite image including at least a portion of the field of view of each of the plurality of imaging devices in calibrated states.

6. The method of claim 4 wherein a field of view aggregated from the plurality of different fields of view in the stored composite image is substantially 360 degrees.

7. The method of claim 1 further comprising calculating the error based on a difference between the at least one of a position or an orientation of the calibration feature and a position or an orientation of the virtual reference feature.

8. The method of claim 6 wherein the stitching of the plurality of images further includes locating the calibration feature in register with the virtual reference feature.

9. The method of claim 1 wherein the calibration feature includes an image of markings on the machine.

10. The method of claim 8 wherein the markings are upon a decal affixed to a body of the machine.

11. A method of setting up a display system in a machine, the method comprising:
    receiving initial image data from a plurality of imaging devices of the display system having a plurality of different fields of view each including a different part of the machine, the initial image data defining a plurality of images including a plurality of setup features that are each imaged from an article external to the machine;
    storing image stitching settings that are based upon at least one of relative locations or relative orientations among the plurality of setup features;

receiving subsequent image data from the plurality of imaging devices of the display system, the subsequent image data defining a plurality of images including a plurality of virtual reference features each imaged from an article resident on the machine;

stitching the plurality of images defined by the subsequent image data according to the stored image stitching settings; and storing a calibration model that includes the plurality of virtual reference features arranged according to the stitching of the plurality of images.

12. The method of claim 11 wherein the receiving of initial image data from a plurality of imaging devices of the display system further includes receiving initial image data defining a plurality of images including a plurality of setup features each imaged from an article placed upon an underlying substrate and located adjacent to the machine.

13. The method of claim 12 further comprising establishing the image stitching settings at least in part by aligning the plurality of setup features at seams between images defined by image data from a plurality of the imaging devices having adjacent and overlapping fields of view.

14. The method of claim 11 wherein an aggregated field of view of the plurality of imaging devices is equal to about 360 degrees.

15. The method of claim 11 wherein the plurality of virtual reference features include images of markings on a body of the machine.

16. The method of claim 11 wherein the stored calibration model includes a composite image formed from the plurality of images defined by the subsequent image data.

17. The method of claim 16 further comprising associating each one of the plurality of reference images with one of the plurality of imaging devices, in the stored calibration model.

18. A machine system comprising:
a machine including a machine body, and a plurality of ground-engaging propulsion elements supporting the machine body;
a display system including a display, a plurality of imaging devices mounted to the machine body and having a plurality of different fields of view, and a control mechanism;
the plurality of imaging devices being structured to produce image data defining a plurality of images of the corresponding field of view, and at least one of the plurality of images including a calibration feature that is imaged from an article resident on the machine; and
the control mechanism being structured to receive the image data from the plurality of imaging devices, compare the calibration feature with a virtual reference feature in a stored calibration model, and stitch the plurality of images for displaying on the display according to an error in at least one of a location or an orientation of the calibration feature relative to the virtual reference feature.

19. The machine system of claim 18 wherein an aggregated field of view of the plurality of imaging devices is equal to about 360 degrees.

20. The machine system of claim 19 wherein the machine further includes an operator cab, and the display is positioned within the operator cab.

* * * * *